US008514836B2

(12) United States Patent
Frenger et al.

(10) Patent No.: US 8,514,836 B2
(45) Date of Patent: Aug. 20, 2013

(54) SWITCHING BETWEEN OPEN AND CLOSED LOOP MULTI-STREAM TRANSMISSION

(75) Inventors: Pål Frenger, Linköping (SE); George Jöngren, Stockholm (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 91 days.

(21) Appl. No.: 13/055,392

(22) PCT Filed: Mar. 16, 2010

(86) PCT No.: PCT/SE2010/050287
§ 371 (c)(1),
(2), (4) Date: Aug. 4, 2011

(87) PCT Pub. No.: WO2011/115532
PCT Pub. Date: Sep. 22, 2011

(65) Prior Publication Data
US 2012/0028628 A1    Feb. 2, 2012

(51) Int. Cl.
*H04J 3/24* (2006.01)
(52) U.S. Cl.
USPC .......................................... 370/349; 370/332
(58) Field of Classification Search
USPC .................. 370/332, 333, 334, 349, 350
See application file for complete search history.

(56) References Cited

U.S. PATENT DOCUMENTS

| 7,634,017 B2 | 12/2009 | Sawai | |
|---|---|---|---|
| 7,944,985 B2 * | 5/2011 | ElGamal et al. | 375/267 |
| 8,212,207 B2 * | 7/2012 | Jiang et al. | 250/282 |
| 8,320,487 B2 * | 11/2012 | Erceg et al. | 375/267 |
| 2005/0181739 A1 * | 8/2005 | Krasny et al. | 455/69 |
| 2008/0192683 A1 * | 8/2008 | Han et al. | 370/329 |
| 2011/0222629 A1 * | 9/2011 | Lindh et al. | 375/296 |

FOREIGN PATENT DOCUMENTS

| EP | 2234437 A1 | 9/2010 |
|---|---|---|
| WO | 2009/091028 A1 | 7/2009 |

OTHER PUBLICATIONS

Swedish Patent Office, Int'l Search Report in PCT/SE2010/050287, Dec. 8, 2010.
Swedish Patent Office, Written Opinion in PCT/SE2010/050287, Dec. 8, 2010.
C.F. Ball et al., Performance Analysis of Closed and Open Loop MIMO in LTE, European Wireless Conference 2009, May 17-20, 2009, pp. 260-265.
3GPP, Multiplexing and Channel Coding (Release 8), Technical Specification 36.212, V8.8.0, Dec. 2009.

(Continued)

*Primary Examiner* — Brenda H Pham
(74) *Attorney, Agent, or Firm* — Potomac Patent Group PLLC (57) ABSTRACT

The present invention relates to a method and apparatus for multi-stream wireless communication between a transmitter node and a receiver node. The method comprises applying an open-loop multi-stream transmission technique during an initial part of a transmission burst. In another step of the method, detailed channel state information is received (54). The detailed channel state information indicates transmission precoding to be used during the transmission burst when applying a closed-loop multi-stream transmission technique. The method further includes switching (55) from the open-loop multi-stream transmission technique to the closed-loop multi-stream transmission technique during the transmission burst, in response to receiving the detailed channel state information. The method is applicable to both uplink and downlink transmission bursts.

20 Claims, 3 Drawing Sheets

(56) References Cited

OTHER PUBLICATIONS

3GPP, Physical Layer Procedures (Release 8), Technical Specification 36.213, V8.8.0, Sep. 2009.

3GPP, Radio Resources Control (RRC) Protocol Specification (Release 9), Technical Specification 36.331 V9.0.0, Sep. 2009.

* cited by examiner

SWITCHING BETWEEN OPEN AND CLOSED LOOP MULTI-STREAM TRANSMISSION

TECHNICAL FIELD

The present invention relates to multi-stream wireless communication and in particular to switching of transmission technique during a transmission burst.

BACKGROUND

In 3GPP (Third Generation Partnership Program) reference signal design for LTE (Long Term Evolution) Rel-10 is currently under discussion. In order to support up to 8 layer transmissions as well as CoMP (Coordinated multi-point) an extended set of UE specific demodulation reference signals (DRS) will be defined. Furthermore, a new set of reference signals is being discussed for channel state information feedback (CSI-RS). The CSI-RS that are currently proposed in 3GPP are sparse in time and frequency and can be DTX:ed (DTX—Discontinuous Transmission) without breaking any critical system functions.

LTE Rel-8 supports both open-loop as well as closed-loop multi-stream transmission in the downlink, also referred to as open-loop spatial multiplexing and closed-loop spatial multiplexing. In case of closed-loop spatial multiplexing a user equipment (UE) reports a recommended number of layers, Rank Indication (RI), and a recommended pre-coder matrix, Pre-coder-Matrix Indication (PMI) to an eNodeB (eNB) to assist selection of a suitable pre-coder matrix for transmission. The eNB can follow the recommendations, but is not obliged to do so. If the recommendations are not followed the eNB explicitly informs the UE what pre-coder matrix it will use for transmission. In contrast, open-loop spatial multiplexing (also often referred to as large-delay CDD), neither requires detailed feedback from the UE regarding recommended pre-coding nor any explicit signaling from the eNB to the UE regarding pre-coder selection.

One issue with the prior art closed-loop transmission schemes is that when the bandwidth is increased (up to 100 MHz in Rel-10) at the same time as the number of layers (up to 8 in Rel-10) increase, the gain in relation to the overhead becomes questionable in some scenarios. First of all, in case of full rank transmission then it is of less importance which pre-coding matrix is chosen. In case of full rank transmission it is not possible to have an array gain on all layers and hence the performance of the different pre-coders that may be selected will become fairly similar. The pre-coding may help in orthogonalizing the channel, but this effect is usually quite limited unless the pre-coders can very accurately match the instantaneous channel realizations.

A second issue with the prior art closed-loop transmission schemes is related to the fact that when the bit-rate is increased then effectively the number of transmission bursts that may be considered too small for achieving a closed loop performance boost is increased. It takes some time before the UE has measured the CSI (Channel State Information) and reported it to the eNB so that the eNB can adjust the transmission pre-coders accordingly, and if the transmission burst is small (i.e. it requires only a short transmission time) the packet transfer will already be over by then. Thus for small transmission bursts the CSI estimation and feedback drains the UE battery and the CSI reference symbols consume energy in the eNB, but these efforts provide limited performance gain.

In the closed-loop spatial multiplexing scheme defined for LTE Rel-8 and specified in the standard specification 3GPP TS 36.212, "Multiplexing and channel coding", v. 8.8.0, a TPMI (transmit pre-coder matrix indicator) is sent in the downlink to the UE. With TPMI signaling it is possible to indicate that:

The pre-coding used is the same as what the UE reported in the last PMI report.

Alternatively an explicit PMI is indicated that is used on all scheduled sub-bands.

Furthermore, for robustness reasons it is possible to indicate that the current transmission uses transmit diversity (TX diversity). TX diversity is a robust transmission scheme, but it is single-rank, i.e. not multi-stream.

There are also other challenges related to closed-loop spatial multiplexing than the issues mentioned above. Assume for instance that a certain UE has reported a rank indicator (RI) of e.g. 2 to an eNB, but the eNB has not yet received any PMI report from the UE. Which line of action is then the best for the eNB? The eNB may either select rank 2 with a fixed pre-coding matrix (but which one?), wait until a CSI report has been received (causing packet delay), or use TX diversity (robustness at the cost of rank loss). Alternatively the eNB can constantly request detailed CSI reports from UEs in case they might be needed, but such operation drains the UE battery.

There are thus a number of problems and challenges associated with prior art closed loop transmission schemes.

SUMMARY

An object of the present invention is to provide a method and arrangement that overcome, at least to some extent, the above described problems and challenges associated with prior art transmission techniques.

The above stated object is achieved by means of a method and an apparatus according to the independent claims.

A basic idea of embodiments of the present invention is to enable switching from an open-loop multi-stream transmission technique to a closed-loop multi-stream transmission technique during a transmission burst. This allows for improved exploitation of the individual benefits of the different types of transmission techniques.

A first embodiment of the present invention provides a method of multi-stream wireless communication between a transmitter node and a receiver node. The method comprises a step of applying an open-loop multi-stream transmission technique during an initial part of a transmission burst. The method furthermore comprises receiving detailed channel state information. The detailed channel state information indicates transmission pre-coding to be used during the transmission burst when applying a closed-loop multi-stream transmission technique. The method also comprises a step of switching from the open-loop multi-stream transmission technique to the closed-loop multi-stream transmission technique, during the transmission burst, in response to receiving the detailed channel state information.

A second embodiment of the present invention provides an apparatus for multi-stream wireless communication. The apparatus comprises transmitter circuits configured to transmit a transmission burst to a receiver node according to an open-loop multi-stream transmission technique or a closed-loop multi-stream transmission technique.

The apparatus also comprises receiver circuits configured to receive detailed channel state information. The detailed channel state information indicates transmission pre-coding to be used during the transmission burst when applying the closed-loop multi-stream transmission technique. The apparatus furthermore comprises control circuits configured to control the transmitter circuits to apply the open-loop multi-stream transmission technique or the closed-loop multi-stream transmission technique. For this purpose the control circuits are configured to control the transmitter circuits to apply the open-loop multi-stream transmission technique during an initial part of the transmission burst, and to control the transmitter circuits to switch from applying the open-loop transmission technique to applying the closed-loop transmission technique during the transmission burst, in response to reception of the detailed channel state information.

An advantage of embodiments of the present invention is that benefits associated with the open-loop transmission technique and with the closed-loop transmission technique respectively can be combined. The closed-loop transmission technique may be used when the gain outweighs the costs involved. Thus, embodiments of the present invention allow for improved efficiency in transmission of a transmission burst.

Another advantage is that embodiments of the present invention are not limited to a single direction of transmission, but are applicable to uplink transmission scenarios as well as downlink transmission scenarios.

Yet another advantage of embodiments of the present invention is that they help reducing packet delay, since they allow for starting data transmission immediately with a good open-loop transmission format.

A further advantage of embodiments of the present invention is that they allow for reducing the number of detailed channel state reports that are transmitted from a UE to a base station. This reduces UE energy consumption and extends UE battery life.

Yet a further advantage of embodiments of the present invention is that they allow for channel state information reference signals to be DTX:ed at any time, which helps reducing network energy consumption.

Another further advantage of embodiments of the present invention is that they allow for a better trade-off between downlink and uplink capacity. With closed-loop downlink transmission the downlink performance can be enhanced at the cost of the uplink performance. Open-loop transmission in the downlink on the other hand reduces the need for transmitting control signaling in the uplink. Embodiments of the present invention provide tools for balancing the downlink and uplink capacity gains and costs.

Another advantage of embodiments of the present invention is that they allow for better trade off between feedback cost and performance gain than prior art solutions. Therefore the present invention enables the use of advance rich feedback MIMO (Multiple-Input/Multiple-Output) schemes such as non-codebook based SVD-MIMO (Singular Value Decomposition MIMO). The embodiments of the present invention can be used to guarantee that the costly rich feedback and the corresponding high performance closed-loop transmission scheme is used only when the feedback cost is acceptable.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Throughout this application the term "transmission burst" is used to refer to a group of data packets to be transmitted sequentially to the same receiver. The term "detailed channel state information" is used herein to refer to channel state information indicating transmission pre-coding to be used during a transmission burst when applying a closed-loop multi-stream transmission technique. The term "transmission pre-coding" as used herein is intended to encompass both implicit and explicit information regarding pre-coding weights, such as codebook based pre-coding as specified for the 3GPP LTE Rel-8 standard, and non-codebook based pre-coding as will be explained in greater detail below. The terms "user equipment" (UE) and "mobile terminal" are considered synonymous in this application and are used interchangeably.

Embodiments of the present invention provide an enhanced multi-stream transmission protocol that enables a transmitter to switch transmission technique during a transmission burst from open-loop to closed-loop where the open-loop transmission technique is used in the beginning of the transmission burst. The switch from the open-loop to the closed loop transmission technique during the transmission burst is triggered by that detailed channel state information is available at the transmitter. Certain embodiment provide for a further switch from the closed-loop transmission technique to the open-loop transmission technique during the transmission burst triggered by that reliable detailed channel state information from the receiver is not available at the transmitter.

Figure 1:
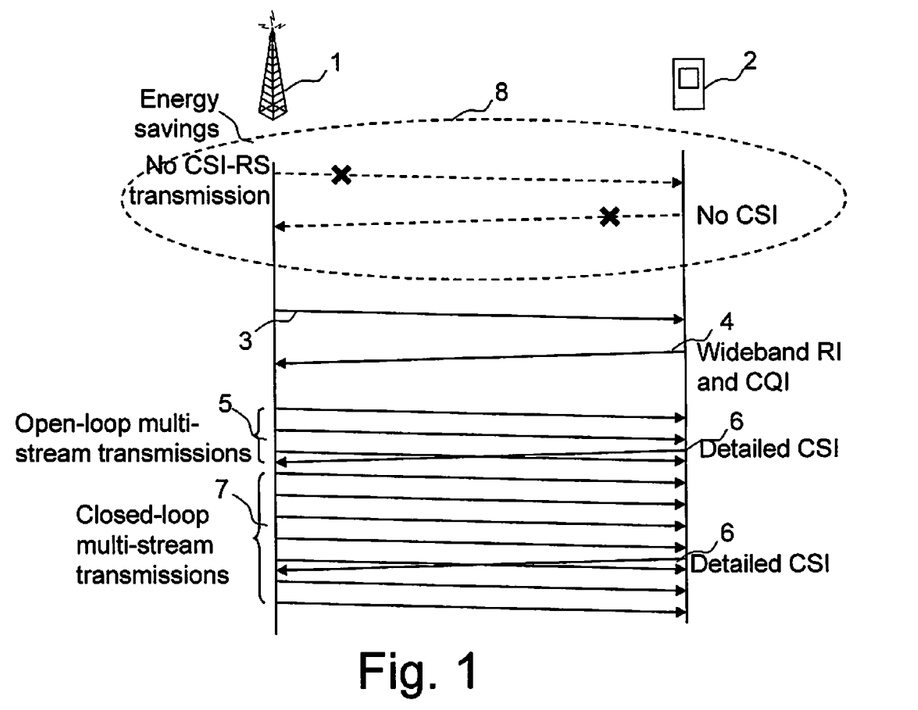
FIG. 1 is a schematic signaling diagram providing an illustration of an embodiment of the present invention in a downlink transmission scenario, as well as a comparison to prior art.

FIG. 1 is a schematic signaling diagram illustrating signaling when an embodiment of the present invention is applied in an exemplary scenario of a downlink transmission burst. Since FIG. 1 relates to a downlink scenario a transmitter node 1 is a base station, such as a NodeB or an eNodeB, and a receiver node 2 is a UE, such as a mobile phone, laptop computer, PDA or other type of mobile terminal. The base station (i.e. the transmitter node 1) transmits known reference symbols CSI-RS 3 to the UE (i.e. the receiver node 2) to allow for estimation of the radio channel. The UE will provide feedback signaling to the base station in the form of channel state reports, also referred to as CSI reports. There are different types of CSI reports comprising different types of information. In FIG. 1 it is illustrated that the UE first transmits a channel-status report 4 to the base station that comprises wideband rank indication (RI) and channel-quality indication (CQI). The RI is information indicating the number of layers that the UE recommends should be used for downlink transmission to the UE. CQI is an indication of the recommended modulation scheme and coding rate for the downlink transmission. Wideband channel-status reports apply for the entire cell bandwidth. FIG. 1 also illustrates that at a later point in time the UE transmits a channel-status report referred to as a detailed CSI 6. The detailed CSI 6 includes a precoder matrix indication (PMI) which indicates a recommended precoder matrix to be used for closed-loop downlink transmission. The PMI may be frequency selective, i.e. different precoders may be recommended for different parts of the downlink spectrum. There are different modes for reporting channel-status information and different types of information need to be reported at different intervals. Typically RI can be reported less often than CQI and PMI (in case of closed-loop transmission).

In an initial part of the transmission burst, before receiving the detailed CSI 6, the base station applies an open-loop multi stream transmission technique 5. When the detailed CSI 6 is received, according to this embodiment of the present invention, the base station switches to a closed-loop multi-stream transmission technique 7 applying the precoders recommended by the UE in the detailed CSI. This transmission scheme enables energy savings in the base station since CSI-RS can be DTX:ed. Discontinuous transmission (DTX) of channel state information reference signals means that the channel state information reference signals are momentarily interrupted. This is made possible by embodiments of the present invention since they allow for less dependency on the CSI-RS because the open-loop multi stream transmission technique may be used when the CSI-RS is not available. The open-loop multi-stream transmission technique does not provide as high performance as the closed-loop transmission scheme but at least it has higher performance than single-stream transmit diversity. The possibility of energy savings since the CSI-RS can be DTX:ed is symbolically illustrated in FIG. 1 by crossed out signals in a dashed oval 8. Also it is possible to reduce the amount of unnecessary CSI feedback from the UE as will be explained further below.

According to certain embodiments of the present invention the transmitter node is adapted to request detailed channel state information from the receiver only if one or several pre-determined conditions are fulfilled. In some situations the usefulness of the detailed channel state information is questionable, and in other situations there may not be available channel resources for requesting and/or receiving the detailed channel state information.

When referring to the usefulness of the channel state information herein, it is meant to refer to the impact that the channel state information can have on the transmission. An example where the usefulness of the detailed channel state information is limited is when the transmission burst is small or when the remaining transmission burst is small. The transmission burst might very well be over once the detailed channel state information is received or the detailed channel state report might have a positive impact only on transmission on a very small amount of data. Thus, the transmitter node may decide to transmit small transmission bursts, for which it is estimated that reliable closed loop feedback will not be available in time, with open-loop multi-stream transmission only. Also, when the transmission burst is about to end the transmitter node may choose to not request a detailed channel state report from the receiver node since that report will only have a limited performance impact on a small amount of remaining data. A channel state report that arrives to the transmitter node before the transmission of the transmission burst is finalized will have a positive impact on performance during a certain time typically spanning several transmission time intervals (the number depending on the time correlation of the channel) until the channel state reports gets outdated. If only a small number of transmission time intervals remains of the transmission burst (e.g. one or two) then the cost of transmitting the last CSI report may be considered too large in relation to the expected gain of receiving it. Instead the transmitter node may change back from the closed-loop transmission technique to the open-loop transmission technique for the remaining part of the transmission burst.

Another reason why a base station may not request a detailed CSI report from a mobile terminal is that the uplink cost of transmitting the report is not considered affordable at the moment. For example, a detailed CSI report typically requires that the base station assigns the mobile terminal with a scheduled resource on the uplink. If the uplink is currently fully scheduled with data or if the control channel capacity is currently exhausted it might be better to use the uplink data resources and/or the downlink resources for other purposes. Thus in the middle of a large transmission burst the base station may temporarily switch to an open-loop multi-stream transmission technique in the downlink until it can afford to schedule the mobile terminal for a detailed CSI report. Should the required resources become available after a few transmission time intervals then the base station can request a detailed CSI report from the mobile terminal again. Once the detailed CSI report is available at the transmitter side the transmission of the data burst continues with a more efficient closed-loop multi-stream transmission technique.

Accordingly examples of predetermined conditions for when detailed CSI reports are to be requested are:

a threshold relating to the size of the transmission burst remaining to be transmitted, i.e. if the size of the remaining transmission burst is below the threshold then no detailed channel state report is requested since it is expected to have little or no impact as discussed above;

a control channel resource threshold associated with requesting a detailed channel state report from the receiver, i.e. if the request of said report consumes control channel resources then said report is only requested when said resources are available or would otherwise be unused;

a data channel resource threshold in the reverse link associated with transmitting a detailed feedback report from the receiver, i.e. said report is only requested if the data channel resources on the reverse link needed for transmission of said report are available or would otherwise be unused.

Figure 2:
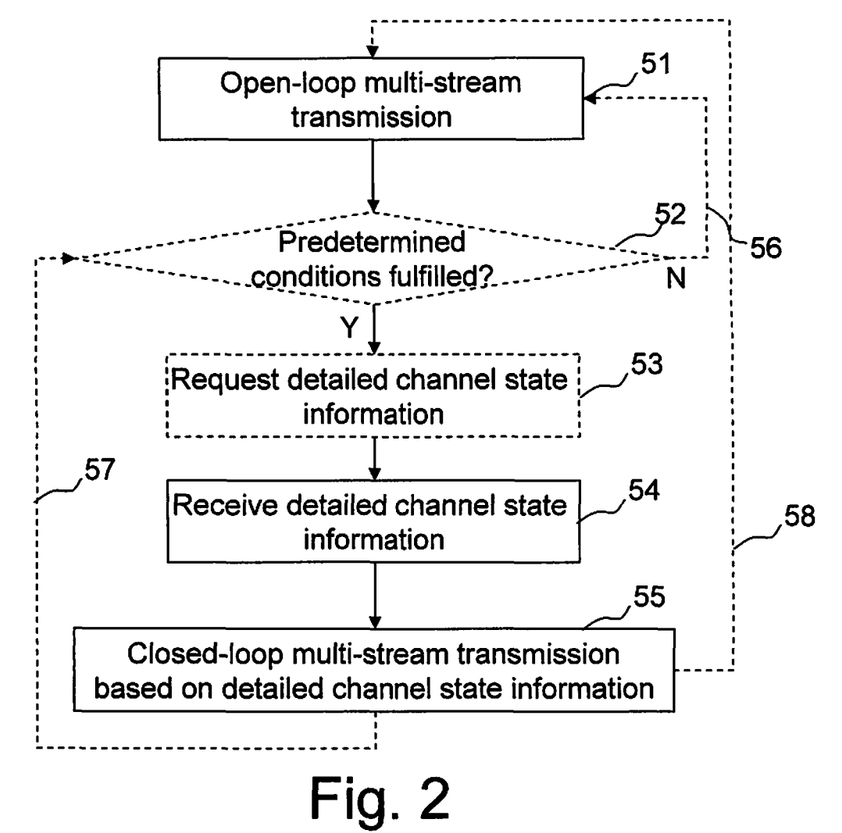
FIG. 2 is a flow diagram which illustrates a method of multi-stream wireless communication according to alternative embodiments of the present invention.

FIG. 2 is a flow diagram which illustrates a method of multi-stream wireless communication according to alternative embodiments of the present invention. In an initial part of the transmission burst the open-loop multi-stream transmission technique is applied, step 51. In a step 54 detailed channel state information is received, which triggers a switch to the closed-loop multi-stream transmission technique, step 55. As described above, an optional step 52, of checking if pre-determined conditions for requesting detailed channel state information are fulfilled, may be included in the method. If the predetermined conditions are fulfilled the detailed channel state information is requested in optional step 54, if not open-loop multi-stream transmission is applied, i.e. a transition 56 back to the step 51. It is also indicated in the FIG. 2 that it is possible to switch from the closed-loop multi-stream transmission technique back to the open-loop multi-stream transmission technique, which is indicated by transitions 57 and 58. The transition 57 may for example occur when monitoring the size of the remaining transmission burst to determine if it is considered affordable to request further detailed channel state reports. Transition 58 may occur in a situation where the received detailed channel state information is no longer reliable e.g. because it has become outdated and no updated channel state reports are available in the transmitter node.

Figure 3:
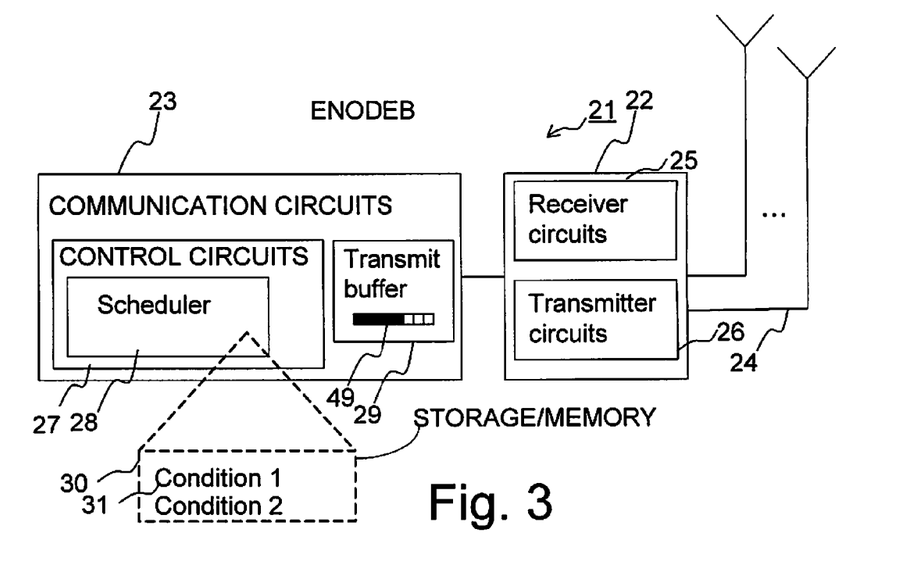
FIG. 3 is a schematic block diagram of an eNodeB according to an embodiment of the present invention.

FIG. 3 is a schematic block diagram of an eNodeB 21 according to an embodiment of the present invention. However, FIG. 3 may also be used to illustrate other types of base stations such as a NodeB. 11. The eNodeB 21 includes transceiver circuits 22, communication circuits 23 and a plurality of antenna ports 24. The transceiver circuits 22 comprises transmitter circuits 26, which are configured to transmit transmission bursts to receiver nodes according to open-loop multi-stream transmission as well as closed-loop multi-stream transmission, and receiver circuits 25 configured to at least receive detailed channel state information. The communication circuits 23 comprises control circuits 27 configured to control the transmitter circuits to apply the open-loop multi-stream transmission technique or the closed-loop multi-stream transmission technique in accordance with the method steps illustrated in FIG. 2. FIG. 3 also illustrates that the communication circuits 23 comprises a scheduler 28, and a transmit buffer 29, in which a transmitter burst 49 is schematically shown. If predetermined conditions are applied for determining if detailed channel state information should be requested, then such predetermined conditions 31 may be stored in a memory 30 as illustrated in FIG. 3. The person skilled in the art will appreciate how the circuits and units illustrated in FIG. 3 may be implemented using hardware, software, firmware or combinations thereof. It will furthermore be apparent to the person skilled in the art that the illustration of the separate circuits and units in FIG. 3 is primarily based on a functional description, since several of the circuits and units may be realized as physically integrate.

It should be noted that the invention is applicable also in the case where several base stations cooperate, as in downlink coordinated multi-point transmission (CoMP). Also CoMP schemes can operate in either closed-loop or open-loop mode in a similar manner as multi-stream transmissions from a single base station. In such scenarios the control circuits, transmitter circuits, receiver circuits etc. are distributed over several physical nodes. Therefore it should be understood that when referring to an "apparatus for multi-stream wireless communication", a "transmitter node" or a "receiver node" herein, these terms encompass e.g. a plurality of cooperating base stations acting as one distributed node, as well as a single base station or UE.

Embodiments of the present invention facilitate DTX of the CSI-RS as well as low rate CSI feedback from the UEs. According to certain embodiments, if the estimated channel quality is below a configurable threshold (due to e.g. a very bad channel or lack of CSI-RS), then the UE will not send any CSI report (not even the low rate RI and wide-band CQI reports). When the CSI-RS is transmitted from the base station the UEs that are configured accordingly transmit low rate CSI-feedback. Detailed CSI feedback can then be explicitly requested (as in current 3GPP LTE standard Rel-8).

The present invention is not limited to downlink transmission only since the principle of switching between an open-loop and a closed-loop transmission technique within a transmission burst is equally applicable for the case of uplink multi-stream transmissions. As an example, 3GPP LTE standard Rel-10 will support uplink multi-stream transmissions with up to 4 layers, and embodiments of this invention would be applicable also in such a scenario. The transmission of sounding reference signals (SRS) from the UE would then play the role of CSI feedback and scheduling and selection of open/closed loop would also in this case be performed at the base station side.

Figure 4:
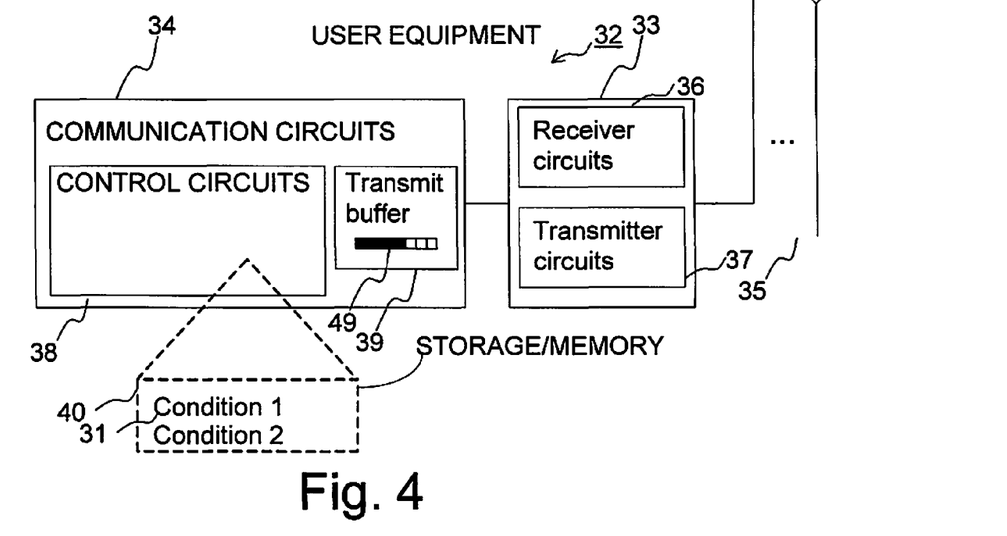
FIG. 4 is a schematic block diagram of a user equipment according to an embodiment of the present invention.

Therefore the method illustrated in FIG. 2 may be performed in a UE as well as in a base station. FIG. 4 is a schematic block diagram of a UE 32 according to an embodiment of the present invention. The UE 32 comprises to a large extent units and circuits corresponding to those of the eNodeB 21 in FIG. 3 so the function of such corresponding units and circuits will therefore not be described in detail. The UE 32 comprises transceiver circuits 33, including receiver circuits 36 and transmitter circuits 37, communication circuits 34 and a number of antenna ports 35. The communication circuits 34 comprises control circuits 38, a transmit buffer 39, and a memory 40.

Figure 5:
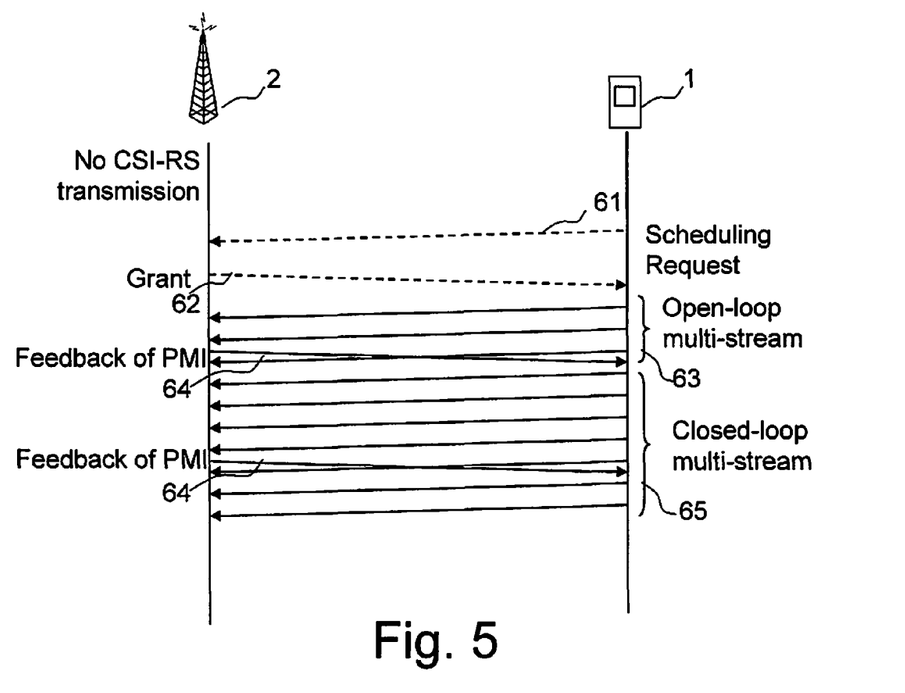
FIG. 5 is a schematic signaling diagram providing and illustration of an embodiment of the present invention in an uplink transmission scenario.

FIG. 5 is a schematic signaling diagram illustrating signaling when an embodiment of the present invention is applied in an exemplary scenario of an uplink transmission burst. Note that in FIG. 5 the transmitter node 1 is a UE, while the receiver node 2 is a base station (cf. FIG. 1). The transmission may begin with a scheduling request 61 and a grant 62. The scheduling request-grant signaling is not always needed. It is possible to use contention based access for the first uplink transmissions from the UE. Also there may be more than one grant in a real system even if the figure only shows the first grant explicitly. Open-loop multi-stream transmissions 63 are applied in an initial part of the transmission burst until feedback 64 of transmission precoding weights (PMI) is received from the base station. Upon reception of the feedback 64, the UE switches to closed-loop multi-stream transmission 65.

For the uplink in LTE it is not possible to talk about frequency selective PMI since the uplink is single-carrier in LTE. Therefore, for LTE the feedback from the base station to the UE will be rather limited i.e. it is only one single precoding matrix indicator (PMI) value. It is however possible to use an uplink embodiment of the invention in e.g. an 802.16m type of system where also the uplink uses OFDM modulation and for such a type of system the amount of feedback will be more extensive.

Now, some LTE specific embodiments of the present invention will be described in further detail. First the current content of relevant parts of the standard will be described, followed by some suggested modifications to implement embodiments of the present invention.

Multi-stream transmission is supported in 3GPP LTE standard Rel-8 in transmission modes 3 and 4, see Table 1, which corresponds to table 7.1-5 in the standard document 3GPP TS 36.213, "Physical layer procedures", v.8.8.0. Closed loop spatial multiplexing makes use of Downlink Control Information (DCI) format 2, while the open loop spatial multiplexing scheme, known as Large delay CDD in 3GPP terminology, uses DCI format 2A (underlined and bold in Table 1).

TABLE 1

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port; port 5 (see subclause 7.1.1) |

The DCI formats 2 and 2A are defined in the standard document 3GPP TS 36.212, "Multiplexing and channel coding", v. 8.8.0 in tables 5.3.3.1.5-5 and 5.3.3.1.5A-2, which correspond to Tables 2 and 3 below respectively.

TABLE 2

Content of precoding information field for 4 antenna ports (DCI format 2)

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . | . |
| . | . | . | . |
| . | . | . | . |
| . | . | 15 | 2 layers: TPMI = 15 |
| . | . | | |
| . | . | | |
| 16 | 1 layer: TPMI = 15 | 16 | 2 layers: Precoding according to the latest PMI report on PUSCH using the precoder(s) indicated by the reported PMI(s) |

TABLE 2-continued

Content of precoding information field for 4 antenna ports (DCI format 2)

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | . | . |
| . | . | . | . |
| . | . | 32 | 3 layers: TPMI = 15 |
| . | . | | |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |
| 35-63 | Reserved | 35 | 4 layers: TPMI = 1 |
| | | . | . |
| | | . | . |
| | | 49 | 4 layers: TPMI = 15 |
| | | 50 | 4 layers: Precoding according to the latest PMI report on PUSCH using the precoder(s) indicated by the reported PMI(s) |
| | | 51-63 | Reserved |

TABLE 3

Content of precoding information field for 4 antenna ports (DCI Format 2A)

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | Reserved | 2 | 4 layers: precoder cycling with large delay CDD |
| 3 | Reserved | 3 | reserved |

Note that since the configuration of transmission format (format 3 or format 4 for open-loop or closed-loop spatial multiplexing respectively) is done by RRC signaling (defined in the standard document 3GPP TS 36.331, "Radio resource control (RRC) protocol specification", v.9.0.0.) it is currently, according to prior art, not possible to change between open-loop and closed-loop spatial multiplexing operation quickly enough to adapt to e.g. varying packet transfer sizes. The selection between transmission formats 3 and 4 also affects UE procedures for CQI, PMI, and RI feedback (see section 7.2 in above mentioned TS 36.213).

A solution, according to an embodiment of the present invention, that enables the transmission mode to dynamically change from open-loop to closed-loop formats in LTE Rel-8 is to include one or a few field(s) in the pre-coding information field indicating that the eNB uses open-loop multi-stream transmission with a specified rank even though the UE is currently configured for closed-loop transmission. When the CSI feedback from the UE reaches the eNB it is possible to immediately switch to close loop multi-stream transmission. Thus, the invention can be incorporated into the LTE standard if it is simply modified to allow that the open loop formats defined for DCI format 2A are accessible also in the closed loop formats defined in DCI format 2. Since the DCI format 2 table contains a sufficient number of reserved entries, the additional open-loop formats would fit into the table without having to expand the table size. A proposed update for the recoding table in DCI format 2 that enables the use of this invention is given below, Table 4, with additional table entries for open-loop transmission formats underlined and bold.

schemes the receiver feeds back the transmission weights to be used explicitly, instead of an index, and the pre-coder selection is not limited to a small code-hook. Thus non-codebook based pre-coding can provide higher gains in the forward link, compared to code-book based schemes, at the expense of higher feedback cost in the reverse link. However, with embodiments of the present invention this feedback cost

TABLE 4

Content of precoding information field for 4 antenna ports (DCI format 2, modified with additional table entries for the purpose of enabling the present invention)

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . | . |
| . | . | . | . |
| . | . | 15 | 2 layers: TPMI = 15 |
| . | . | | |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | . | . |
| . | . | . | . |
| . | . | 32 | 3 layers: TPMI = 15 |
| . | . | | |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |
| 35 | 2 layers: precoder cycling with large delay CDD | 35 | 4 layers: TPMI = 1 |
| 36-63 | Reserved | . | . |
| | | 49 | 4 layers: TPMI = 15 |
| | | 50 | 4 layers: Precoding according to the latest PMI report on PUSCH using the precoder(s) indicated by the reported PMI(s) |
| | | 51 | 2 layers: precoder cycling with large delay CDD |
| | | 52 | 3 layers: precoder cycling with large delay CDD |
| | | 53 | 4 layers: precoder cycling with large delay CDD |
| | | 54-63 | Reserved |

It should be noted that embodiments of the present invention are applicable also for other than the codebook based closed-loop multi-stream transmission schemes that are currently specified for the 3GPP LTE Rel-8 standard. In particular, non-codebook based closed-loop multi-stream transmission schemes such as SVD-MIMO (Singular Value Decomposition MIMO) are also well suited for embodiments of the present invention. In non-codebook based pre-coding can be better traded off versus the performance gain, and hence embodiments of the present invention can be viewed as enabling the use of rich feedback MIMO schemes such as non-codebook based SVD-MIMO.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method of multi-stream wireless communication between a transmitter node and a receiver node, the method comprising, in the transmitter node:
applying an open-loop multi-stream transmission technique during an initial part of a transmission burst;
receiving detailed channel state information indicating transmission pre-coding to be used during the transmission burst when applying a closed-loop multi-stream transmission technique; and
switching from the open-loop multi-stream transmission technique to the closed-loop multi-stream transmission technique during the transmission burst in response to receiving the detailed channel state information.

2. The method of claim 1, further comprising requesting the detailed channel state information from the receiver node if a number of predetermined conditions are fulfilled, wherein the number of predetermined conditions relate to usefulness of the detailed channel state information and/or availability of resources for transmission of signaling involved in requesting and/or reporting the detailed channel state information.

3. The method of claim 2, wherein a predetermined condition is a predetermined size threshold for a size of the transmission burst remaining to be transmitted, such that the detailed channel state information is requested only if the size of the transmission burst remaining to be transmitted is larger than the predetermined size threshold.

4. The method of claim 2, wherein a predetermined condition is a control channel resource threshold for available resources on a control channel, such that the detailed channel state information is requested only if there are available resources on the control channel for requesting the detailed channel state information.

5. The method of claim 2, wherein a predetermined condition is a data channel resource threshold for available resources on a data channel, such that the detailed channel state information is requested only if there are available resources on the data channel for transmission of the detailed channel state information.

6. The method of claim 1, further comprising switching from the closed-loop multi-stream transmission technique back to the open-loop multi-stream transmission technique during the transmission burst, in response to up-to-date detailed channel state information not being available at the transmitter node.

7. The method of claim 1, wherein the transmission burst is a downlink transmission burst.

8. The method of claim 7, wherein the transmitter node is an eNodeB of a Long Term Evolution radio access network.

9. The method of claim 8, wherein the eNodeB signals to the receiver node that the open-loop or closed-loop multi-stream transmission technique is being used by including, in a signaling message, an indicator in a pre-coding information field according to a Downlink Control Information format that specifies indicators of both the open-loop multi-stream transmission technique and the closed-loop multi-stream transmission technique.

10. The method of claim 1, wherein the transmission burst is an uplink transmission burst.

11. An apparatus for multi-stream wireless communication, comprising:
a transmitter configured to transmit a transmission burst to a receiver node according to an open-loop multi-stream transmission technique or a closed-loop multi-stream transmission technique;
a receiver configured to receive detailed channel state information indicating transmission pre-coding to be used during the transmission burst when applying the closed-loop multi-stream transmission technique;
a controller configured to control the transmitter to apply the open-loop multi-stream transmission technique or the closed-loop multi-stream transmission technique, wherein the controller is configured to control the transmitter to apply the open-loop multi-stream transmission technique during an initial part of the transmission burst, and to control the transmitter to switch from applying the open-loop transmission technique to applying the closed-loop transmission technique during the transmission burst in response to reception of the detailed channel state information.

12. The apparatus of claim 11, wherein the controller is further configured to control the transmitter to transmit a request for the detailed channel state information to the receiver node if a number of predetermined conditions are fulfilled, wherein the number of predetermined conditions relate to usefulness of the detailed channel state information and/or availability of resources for transmission of signaling involved in requesting and/or reporting the detailed channel state information.

13. The apparatus of claim 12, wherein a pre-determined condition is a predetermined size threshold for a size of the transmission burst remaining to be transmitted, such that the controller is configured to control the transmitter to transmit the request for the detailed channel state information only if the size of the transmission burst remaining to be transmitted is larger than the predetermined size threshold.

14. The apparatus of claim 12, wherein a predetermined condition is a control channel resource threshold for available resources on a control channel, such that the controller is configured to control the transmitter to transmit the request for the detailed channel state information only if there are available resources on the control channel for requesting the detailed channel state information.

15. The apparatus of claim 12, wherein a predetermined condition is a data channel resource threshold for available resources on a data channel, such that the controller is configured to control the transmitter to transmit the request for the detailed channel state information only if there are available resources on the data channel for transmission of the detailed channel state information.

16. The apparatus of claim 11, wherein the controller is further configured to control the transmitter to switch from applying the closed-loop transmission technique to applying the open-loop transmission technique during the transmission burst in response to up-to-date detailed channel state information not being available at the apparatus.

17. The apparatus of claim 11, wherein the transmission burst is a downlink transmission burst.

18. The apparatus of claim 17, wherein the apparatus is an eNodeB configured for use in a Long Term Evolution radio access network.

19. The apparatus of claim 18, wherein the apparatus is configured to signal to the receiver node that the open-loop or closed-loop multi-stream transmission technique is being used by including, in a signaling message, an indicator in a pre-coding information field according to a Downlink Control Information format that specifies indicators of both the open-loop multi-stream transmission technique and the closed-loop multi-stream transmission technique.

20. The apparatus of claim 11, wherein the apparatus is a user equipment for use in a radio access network.

* * * * *

UNITED STATES PATENT AND TRADEMARK OFFICE
CERTIFICATE OF CORRECTION

PATENT NO. : 8,514,836 B2  Page 1 of 1
APPLICATION NO. : 13/055392
DATED : August 20, 2013
INVENTOR(S) : Frenger et al.

It is certified that error appears in the above-identified patent and that said Letters Patent is hereby corrected as shown below:

In the Specification

In Column 7, Line 10, delete "NodeB. 11." and insert -- NodeB. --, therefor.

In Column 14, Line 3, delete "code-hook." and insert -- code-book. --, therefor.

Signed and Sealed this
Fifteenth Day of July, 2014

Michelle K. Lee
*Deputy Director of the United States Patent and Trademark Office*